US012627564B2

(12) United States Patent
Ankaiah et al.

(10) Patent No.: US 12,627,564 B2
(45) Date of Patent: May 12, 2026

(54) DEVICE CLASSIFICATION AT THE EDGE

(71) Applicant: Cambium Networks Ltd, Ashburton (GB)

(72) Inventors: Shashi Hosakere Ankaiah, Karnatake (IN); Trevor Miranda, San Francisco, CA (US); Vivek Lakshminarayana Atreya, Karnatake (IN)

(73) Assignee: Cambium Networks Ltd, Ashburton (GB)

( * ) Notice: Subject to any disclaimer, the term of this patent is extended or adjusted under 35 U.S.C. 154(b) by 22 days.

(21) Appl. No.: 18/735,679

(22) Filed: Jun. 6, 2024

(65) Prior Publication Data

US 2025/0219906 A1 Jul. 3, 2025

(30) Foreign Application Priority Data

Dec. 28, 2023 (IN) .............................. 202341089340

(51) Int. Cl.
H04L 41/16 (2022.01)
H04L 9/40 (2022.01)
H04L 41/0866 (2022.01)

(52) U.S. Cl.
CPC .......... *H04L 41/0866* (2013.01); *H04L 41/16* (2013.01); *H04L 63/08* (2013.01); *H04L 63/0876* (2013.01)

(58) Field of Classification Search
None
See application file for complete search history.

(56) References Cited

U.S. PATENT DOCUMENTS 9,225,732 B2 * 12/2015 Beyah ................. H04L 63/1408
9,330,257 B2 * 5/2016 Valencia ............... G06F 21/316
9,781,097 B2 10/2017 Grajek et al.
9,838,278 B2 * 12/2017 Chadha ................... H04L 43/04
(Continued)

FOREIGN PATENT DOCUMENTS

CN 112600793 A 4/2021
CN 115883381 A 3/2023
(Continued)

OTHER PUBLICATIONS

WO 2022200704 A1 (Year: 2022).*
Extended European Search Report for EP Application No. 24208739.3 dated Mar. 20, 2025 (10 pp.).

*Primary Examiner* — Sandarva Khanal
(74) *Attorney, Agent, or Firm* — Crowell & Moring LLP

(57) ABSTRACT

A method, device, and storage medium are provided and configured to control one or more network functions for user devices in a local network. A fingerprint determination model is provided and configured to determine one or more characteristics of user devices based on messages generated by respective user devices. A first message from a user device is received and processed to determine a set of one or more user device message characteristics. Device fingerprint data, representing at least one determined characteristic of the user device, is generated by processing the set of one or more user device message characteristics using the fingerprint determination model. One or more network functions for the user device are controlled based on the at least one determined characteristics of the user device represented in the device fingerprint data.

24 Claims, 10 Drawing Sheets

(56)  References Cited

U.S. PATENT DOCUMENTS

| 10,135,830 | B2 * | 11/2018 | Bercovich | H04L 63/10 |
|---|---|---|---|---|
| 10,536,439 | B2 * | 1/2020 | Althouse | H04L 63/0428 |
| 10,708,266 | B2 * | 7/2020 | Patwardhan | H04W 12/08 |
| 11,695,763 | B2 * | 7/2023 | Chen | G06N 3/09 |
| | | | | 726/6 |
| 2011/0271345 | A1 | 11/2011 | Wolman et al. | |
| 2012/0084203 | A1 * | 4/2012 | Mehew | G06Q 20/40 |
| | | | | 705/41 |
| 2017/0223011 | A1 * | 8/2017 | Schultz | H04L 65/1104 |
| 2019/0306182 | A1 * | 10/2019 | Fry | H04L 67/10 |
| 2020/0322227 | A1 * | 10/2020 | Janakiraman | H04L 61/4541 |
| 2021/0006471 | A1 * | 1/2021 | Kvasyuk | H04L 47/127 |
| 2021/0400080 | A1 * | 12/2021 | Kaidi | G06N 5/025 |
| 2022/0014923 | A1 * | 1/2022 | Banjade | G01S 5/02213 |
| 2023/0019995 | A1 * | 1/2023 | Locasto | G06F 21/71 |
| 2023/0054201 | A1 * | 2/2023 | Spoto | H04L 63/0272 |
| 2023/0291735 | A1 * | 9/2023 | Cheethirala | H04L 63/0876 |
| 2024/0381096 | A1 * | 11/2024 | Beg | G01S 13/878 |

FOREIGN PATENT DOCUMENTS

| WO | WO-2020140114 | A1 * | 7/2020 | H04L 67/303 |
|---|---|---|---|---|
| WO | WO-2023279027 | A1 * | 1/2023 | H04L 63/10 |

* cited by examiner

100

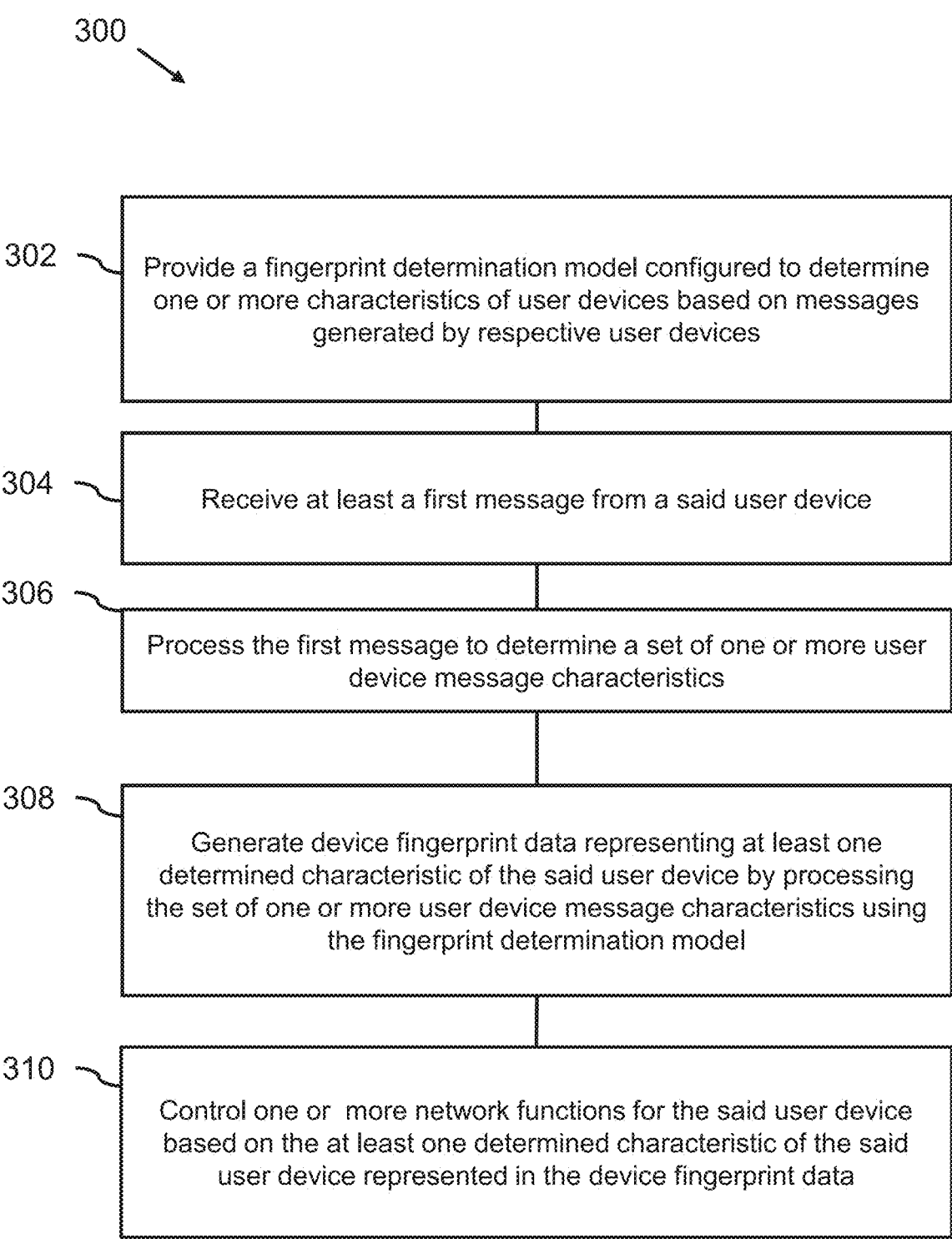

300

302 — Provide a fingerprint determination model configured to determine one or more characteristics of user devices based on messages generated by respective user devices 304 — Receive at least a first message from a said user device 306 — Process the first message to determine a set of one or more user device message characteristics 308 — Generate device fingerprint data representing at least one determined characteristic of the said user device by processing the set of one or more user device message characteristics using the fingerprint determination model 310 — Control one or more network functions for the said user device based on the at least one determined characteristic of the said user device represented in the device fingerprint data

FIG. 3

| MAC | 00:1A:2B:3C:4D:5EMac_1 |
|---|---|
| HTTP User Agents | Mozilla/5.0 (Windows NT 10.0; Win64; x64) |
| DHCP | DHCP_1 |
| Hostname | Johns-Laptop |
| OUI | 00:1A:2B |
| DNS Request | www.example.com |

| ID | Device | Type | OS |
|---|---|---|---|
| A | Laser Jet | Printer | Android |

406

| ID/MAC | Device | Type | OS |
|---|---|---|---|
| A | Laser Jet | Printer | Android |
| B | Macbook | Laptop | - |
| C | UHD TV | - | AndroidTV |
| D | - | Smart-phone | Smartphone OS |
| E | Multicore Workstation | Desktop PC | - |
| F | - | - | Windows Server |
| ... | ... | ... | ... |

DEVICE CLASSIFICATION AT THE EDGE

CROSS-REFERENCE TO RELATED APPLICATION

This application claims priority to India Patent Application No. 202341089340, filed on Dec. 28, 2023, the entirety of which is hereby fully incorporated by reference herein.

TECHNICAL FIELD

The present disclosure relates to computer network management and in particular but not exclusively, to identifying device characteristics and implementing management and/or security functions in the computer network.

BACKGROUND

Computer networks are fundamental to modern computing infrastructure and are widely used in businesses, schools, and homes. With an increasing number of devices having wireless communication capabilities with other devices, the burden on network management, and particularly network security is commensurately increasing. While the number of devices which may be expected to connect to computer networks increases, users also typically expect higher performance and lower latency in computer networks now as compared to the past. The demands on bandwidth capabilities and network latency are increasing.

Device fingerprinting is a technique used to identify and, in some cases track, devices based on their unique characteristics and behaviors. This method is often employed in the context of online security, and fraud detection. Device fingerprinting may also be used as a technique when managing local area networks (LANs) such as those deployed in schools, businesses, homes, and more. For example, device fingerprinting in a local Wi-Fi network can support network security by enabling the identification of unauthorized or suspicious devices.

Device fingerprinting typically involves data collection and the processing of that data to determine one or more characteristics of a device. For example, when a device connects to a Wi-Fi network, details which are shared by the device such as the multimedia access control (MAC) address, may be stored. The MAC address along with other data shared by the device, may be used to identify certain characteristics of the device that has connected.

A MAC address, also referred to as hardware address or a physical address, is a unique identifier assigned to a network interface controller (NIC), typically by a manufacturer. It is used to uniquely identify devices on a network at the data link layer of the network protocol stack.

A MAC address is a 48-bit (6-byte) address, typically represented as six pairs of hexadecimal digits separated by colons or hyphens (e.g., 00:1A:2B:3C:4D:5E). The first half of the MAC address represents the manufacturer or vendor identifier, while the second half is a unique identifier assigned to the specific network interface.

MAC addresses are used for devices to communicate on a local area network (LAN). They are used by the Ethernet protocol to ensure that data is sent to the correct destination device. When a device sends data packets, it includes the MAC address of the intended recipient, allowing the network switched and routers to forward the packets appropriately.

MAC addresses are specific to the data link layer and are typically not routable across different networks. In contrast, IP (Internet Protocol) addresses are used for network communication at the network later and are routable across different networks.

Security is an important area of network management. Ensuring that access to networks, and in particular local area networks in which user devices are connected, is secure is essential for protecting users and their devices from data leaks and other malicious attacks.

SUMMARY

According to a first aspect of the present disclosure there is provided a network management device configured to facilitate communication between user devices connected in a local network and computing devices in an external network, the network management device comprising one or more communication modules, at least one processor, and storage comprising computer-executable instructions which, when executed by the at least one processor, cause the network management device to: provide a fingerprint determination model configured to determine one or more characteristics of user devices based on messages generated by respective user devices; receive at least a first message from a said user device; process the first message to determine a set of one or more user device message characteristics; generate device fingerprint data representing at least one determined characteristic of the said user device by processing the set of one or more user device message characteristics using the fingerprint determination model; and control one or more network functions for the said user device based on the at least one determined characteristics of the said user device represented in the device fingerprint data.

Performing device fingerprinting using a model located within the network, as opposed to relying on an external cloud-based service, offers several benefits. Enhanced privacy and data security: keeping the fingerprinting process internal avoids transmitting sensitive data over the internet, reducing the risk of data breaches and ensuring better control over user data. This is especially important given the privacy concerns associated with device fingerprinting. Reduced latency: processing data locally within the network can significantly reduce latency compared to sending data to a cloud-based service and waiting for a response. This is crucial for applications requiring real-time or near-real-time analysis and decision-making. Lower bandwidth usage: by not having to constantly send data back and forth to the cloud, there's a reduction in bandwidth usage, which can be beneficial for networks with limited bandwidth or in areas with poor internet connectivity. Customization and control: an in-network model allows for more customization and fine-tuning specific to the local network environment and needs, which might not be possible with a one-size-fits-all cloud-based solution. Independent operation: the system can operate independently of external internet connectivity, ensuring continuous functionality even in the event of internet outages or disruptions. Cost-effective: depending on the scale and specific requirements, local processing can be more cost-effective in the long run, as it can reduce the dependency on external cloud services which may come with recurring subscription costs. Compliance with regulatory requirements: for certain industries and regions, there may be regulatory requirements that mandate data processing and storage to occur locally. In-network processing of device fingerprinting aligns with such compliance needs. Quicker implementation of changes and updates: changes, updates, or improvements to the fingerprinting model can be implemented more rapidly and controlled directly, without depending on an external provider's schedule or constraints.

According to a second aspect of the present disclosure there is provided A method of controlling one or more network functions for user devices in a local network, the method comprising: providing a fingerprint determination model configured to determine one or more characteristics of user devices based on messages generated by respective user devices; receiving at least a first message from a said user device; processing the first message to determine a set of one or more user device message characteristics; generating device fingerprint data representing at least one determined characteristic of the said user device by processing the set of one or more user device message characteristics using the fingerprint determination model; and controlling one or more network functions for the said user device based on the at least one determined characteristics of the said user device represented in the device fingerprint data.

According to a third aspect of the present disclosure there is provided a non-transitory computer-readable storage medium comprising computer-executable instructions which, when executed by a processor cause the processor to: provide a fingerprint determination model configured to determine one or more characteristics of a user device based on messages generated by the user device; receive at least a first message from a said user device; process the first message to determine a set of one or more user device message characteristics; generate device fingerprint data representing at least one determined characteristic of the said user device by processing the set of one or more user device message characteristics using the fingerprint determination model; and control one or more network functions for the said user device based on the at least one determined characteristics of the said user device represented in the device fingerprint data.

Further features will be apparent from the following description of preferred examples which is provided with reference to the accompanying Figures.

BRIEF DESCRIPTION OF THE DRAWINGS

FIG. 3 is a flow chart showing a method for the network management device according to examples;

DETAILED DESCRIPTION

Figure 1:
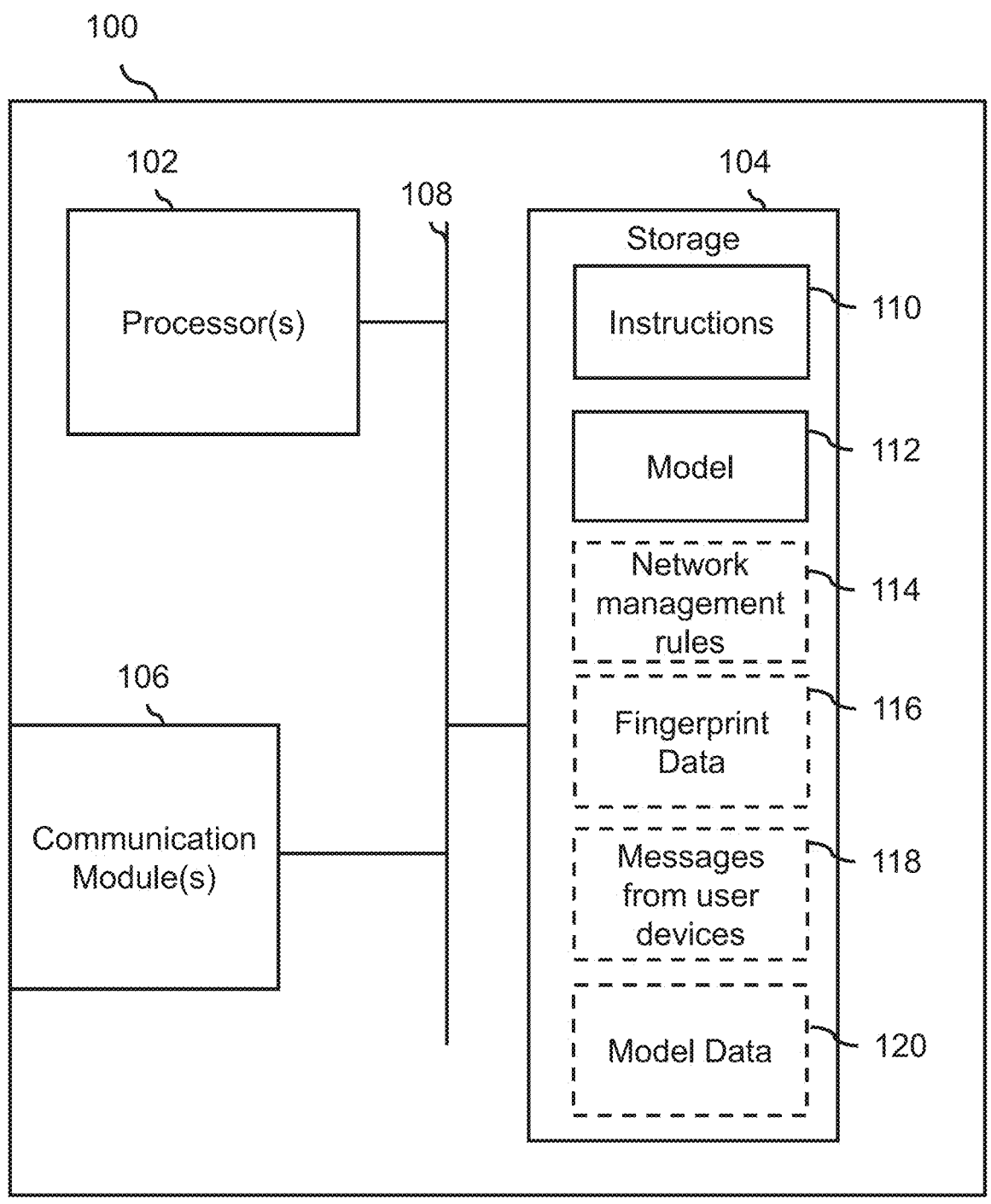
FIG. 1 is a schematic diagram of a network management device according to examples.

Local computer networks, such as local area networks (LANs) and wireless local area networks (WLANs) are used in a variety of environments to connect computing devices. LANs are typically considered to be efficient at connecting devices in close proximity to each other and are able to provide highly stable connections with considerable bandwidth capabilities. WLANs are often used for their convenience and flexibility in providing network connectivity without the need for physical cables.

LANs and WLANs may be used in homes, offices and corporate building, educational institutions, healthcare facilities, retail spaces, transport hubs, hotels and hospitality venues, public spaces and municipalities, industrial and warehouse setting, conferences, and many others. In these environments LANs and WLANs enable computing devices such as a personal computers, laptop computers, mobile smartphones, tablet computers, smart connected appliances, general IoT devices, and many other device types, to communicate.

LANs and WLANs enable devices connected in these local networks to provide services to one another, such as a file sharing, data storage, data transmission, printing, external processing, and so forth. LANs and WLANs are typically implemented using one or more network management device that is configured to facilitate communication between the computing devices in the network. For example, a network management device may be configured to implement certain standards such any of the set of IEEE 802.11 Standards for wireless fidelity (Wi-Fi) communication. Other examples of relevant communications protocols and/or standards that may be provided in a network management device include Wi-Fi protected access (e.g. WPA, WPA2, WPA3), Wi-Fi multimedia (WMM) which is a subset of the 802.11e standard, dynamic host configuration protocol (DHCP), hypertext transfer protocol (HTTP) and HTTP secure (HTTPS), transmission control protocol (TCP), and any other relevant standards or protocols that may be used when communicating with, and facilitating communication between, computing devices.

In some cases, a network management device may also enable devices in the local network to communicate with one or more external, or wide-area, networks such as the internet. For example, a network management device may be, or may comprise, a router that is connected to a wired or wireless access network that enables communications to be sent and received to remote severs and other computing devices over the internet.

Network management devices may be configured to manage and control the security of the networks in which they are deployed. For example network management devices may use encryption protocols such as the Wi-Fi protected access (WPA) family of protocols. Other examples, of functions that may be used to manage the security of the network include the use of passwords, MAC address filtering, firewall and network segmentation, and others.

Device fingerprinting may be used when implementing security protocols and practices local networks. By accurately identifying and tracking which devices are connected in the network it becomes possible to identify suspicious or malicious devices. For example, attackers or malicious users may try to disguise their devices as approved or authenticated devices through MAC spoofing. In some cases, attackers may also leverage multicast DNS protocols to trick user devices to send personal private data to the malicious or fraudulent device connected in the network. Even in examples in which these techniques are not used by malicious users, intending to cause harm or obtain access to data they are not entitled to, the ability for users to circumvent normal network functioning by leveraging these techniques. In particular, such techniques, which circumvent normal network policy and function, are a risk to other users, and make managing and optimization network function difficult.

Device fingerprinting may also be used to precisely, and efficiently, apply network management policies to user devices in a network under normal operating conditions. In large networks, such as those typically deployed in schools and/or businesses, it may be possible to configure network permissions for user devices based on their characteristics or according to some group to which they belong. For example, in a university or college, it may be possible to set different data usage limits, bandwidth limits, and/or access permissions to student's devices as compared to university owned computing devices such as servers, teacher's computers, and so forth.

In other cases, mobile computing devices, such as smartphones, may be provided with more restrictive connectivity capabilities. This may be used to limit unnecessary bandwidth usage, and/or to prevent users from using the network capabilities of their smartphones in secure locations, which may otherwise represent a security risk. Accurately identifying devices connected in the network may also enable accurate information about usage statistics and network performance to be determined and optimized according to network management policies.

Device fingerprinting is typically provided as a cloud-based service due to the resource intensive nature of the operations involved. In particular, device fingerprinting may be performed by leveraging large databases of information which specify relations between characteristics of messages sent to and from devices in a network, and the likely characteristics of those devices, such as the device type, operating system, make, model, and so forth. Due to the standardized nature of communications amongst devices in networks, and the increasing variety of device types available to consumers, it is not uncommon for a considerable number of message characteristics to be collected before an accurate determination of one or more device characteristics can be made. As the number of device manufacturers, and total number of devices, increases there is a correspondingly increasing burden on the size of the databases which are used, and the complexity of the operations which must be performed to accurately determine device characteristics.

When performing fingerprinting of devices connected in a local network, a network management device may perform a cloud lookup, or cloud callout, to the cloud-based device fingerprinting service. For example, this cloud callout may involve sending information collected about devices in the local network to the cloud-based service to determine a characteristic of the respective devices. These cloud lookup calls may be performed whenever a new parameter for a device is determined and an updated fingerprint of the device is to be determined.

Every cloud lookup involves a computational cost, network latency costs, and monetary cost. With the increasing number of devices, speed and volume of data communications, and bandwidth requirements, the costs involved in performing such device fingerprinting may be prohibitive. In particular, where one or more security or other network management functions use on device fingerprinting, the increased latency has made the deployment of these functions prohibitive as users may be unwilling to accept the degradation in service. In some cases, network administrators avoid, or limit, the use of such functions in order to preserver network performance. This in turn may lead to security risks, failure to identify malicious devices on a network, and the inability to deploy sophisticated network management functions.

It has also been found that the use of MAC randomization in modern user devices provides a particular challenge in maintaining accurate device fingerprint information. The use of MAC randomization prevents the use of local cache-based policies for storing and referencing device fingerprint information determined over time. This is because MAC randomization makes binding device fingerprint information to a known MAC address for a device inaccurate as the MAC addresses change over time. In view of MAC randomization, using a local cache-based policy causes the local cache to be filled with random MAC addresses that are not useful for tracking device fingerprint information.

Certain examples described herein provide methods and devices that are configured to enable efficient and fast device fingerprinting in a manner that mitigates the associated latency and performance costs of cloud-based device fingerprinting services. In this way, it is possible to deploy device fingerprinting in a network so that network security functions can be deployed efficiently and precisely.

FIG. 1 shows an example of a network management device 100 configured to facilitate communication between user devices connected in a local network, such as a Wi-Fi network, and computing devices in an external network, such as the internet, according to examples described herein. The network management device comprises one or more processor(s) 102, storage 104, and one or more communications modules 106. The processor(s) 102, storage 104, and communication module(s) 106 are connected over a communication channel, such as a bus 108, allowing them to communicate with each other.

The storage 104 is suitable for storing a set of computer-executable instructions 110 for executing a method 300, which will be described further below with respect to FIGS. 2 to 9. The storage 104 may also be suitable for storing other types of data such as computer-executable instructions, or program code, for implementing a fingerprint determination model 112 which will be described further below. The storage 104 may include any combination of volatile and non-volatile storage, for example, a combination of read-only memory (ROM) and one or more types of random-access memory (RAM), such as dynamic RAM, synchronous RAM, and so forth. ROM may be included in the form of both disc-based (e.g. hard drive) or flash memory (e.g. solid-state drive(s)).

The storage 104 may also be suitable for storing additional data including network management rules 114, fingerprint data 116, messages received from user data 118, data associated with these messages, and model data 120. These data will be described further below with respect to FIGS. 4 to 6.

The processor(s) 102 may include any suitable combination of processing circuitry configured to execute the instructions 110. The processor(s) 102 may include one or more general purpose processors, such as central processing units (CPU), and/or application specific processing circuitry or processing units. The one or more communications modules 106 are configured to enable communication with one or more further computing devices, for example, user devices connected in the local network. To this end, the communications module(s) 106 may comprise wireless and/ or wired communications modules to enable at least one of wired LAN and wireless LAN connectivity. These communications modules 106 may implement known protocols and standards such as Wi-Fi, Bluetooth, Ethernet, and so forth. The network device 100 may be capable of communicating over both local and wide area networks via the communications module(s) 106. In some cases, the network management device 100 may include separate communications modules 106 for communicating with the user devices in the local network and with further computing devices in an external network.

Figure 2:
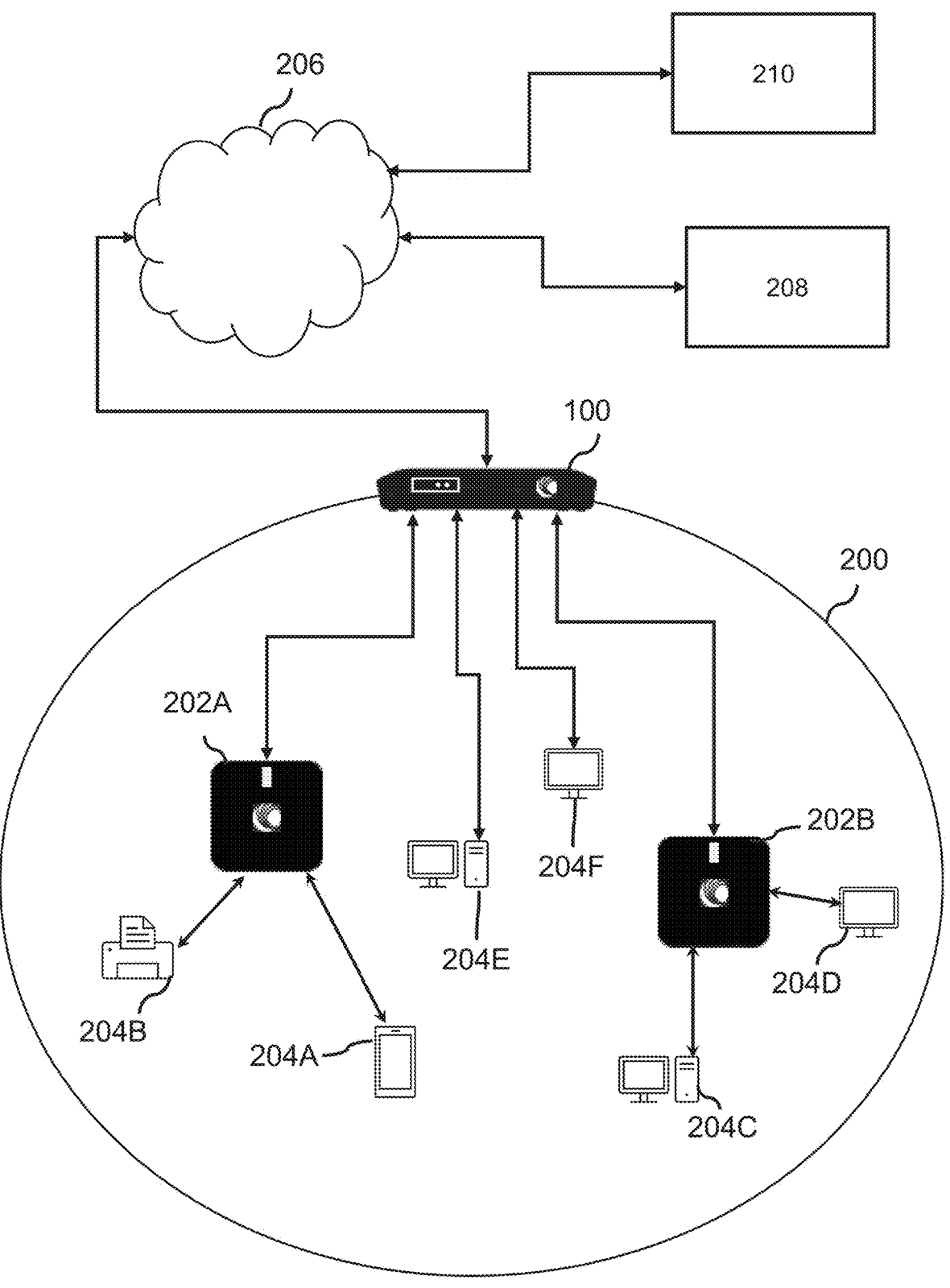
FIG. 2 is a schematic diagram of a computer network in which a network management device according to the example shown in FIG. 1 may be deployed.

Turning to FIG. 2 a network environment in which the network management device 100 may deployed is shown. In the example shown, the network management device 100 is a network edge device configured to facilitate communication between client devices 204A to 204F in the network 200 with one or more external networks 206, such as the internet. A network edge device is a term used to refer to a broad category of network devices which sit at the edge of a network 202 and facilitate communications into and out of that network 202. Examples of network edge devices include routers, and also more sophisticated network management devices which are capable of implementing more functions than are typically understood to be performed by routers.

The network 200 is a local area networks such as that which may be deployed in a home or office environment to enable network computing functions such as file transfer, printing, and so forth between user devices 204A to 204F. The user devices 204A to 204F may also be referred to as client devices, computing devices, or simply devices. It will be appreciated that these devices 204A to 204F may not be associated with specific users.

In FIG. 2 a plurality of device types is shown including printers 204B, smartphones 204A, desktop computers 204C and 204E, smart televisions 204D and 204F. The devices shown in FIG. 2 and connected in the network 200 are provided as examples only and it is to be appreciated that a variety of communications enabled computing devices not shown may also be connected in the network 200, including laptop computers, servers, network attached storage devices, smart appliances, tablet computers, and other connected devices.

The network 200 shown in this example also includes two access points 202A and 202B. In some Wi-Fi networks, access points 202A and 202B may be used to increase the size and range of the network 200, as well as providing certain functions, such as device authentication, to reduce the burden on the network management device 100. As user devices 204A to 204F move throughout the network they may detach from one access point 202A and reattach to another 202B.

Where access points 202A and 202B are deployed in a network., they may be communicatively coupled to the network management device 100 to enable the user devices 204A to 204F to communicate. In some examples, not shown, the access points 202A and 202B may also communicate directly with one another.

Also shown in FIG. 2 is a cloud-based device fingerprinting server 208 as described above. Although not applicable to the methods described herein, it is illustrated for exemplary purposes. As described above, in some cases, network management devices 100 generally, may be configured to communicate with the device fingerprinting server 208 to obtain device fingerprint information relating to devices 204A to 204F connected in the network 200. Also shown is a cloud-based model data server according to examples. The functions of the cloud-based server 210 for providing model data will be described further below with respect to FIG. 9.

Figure 4:
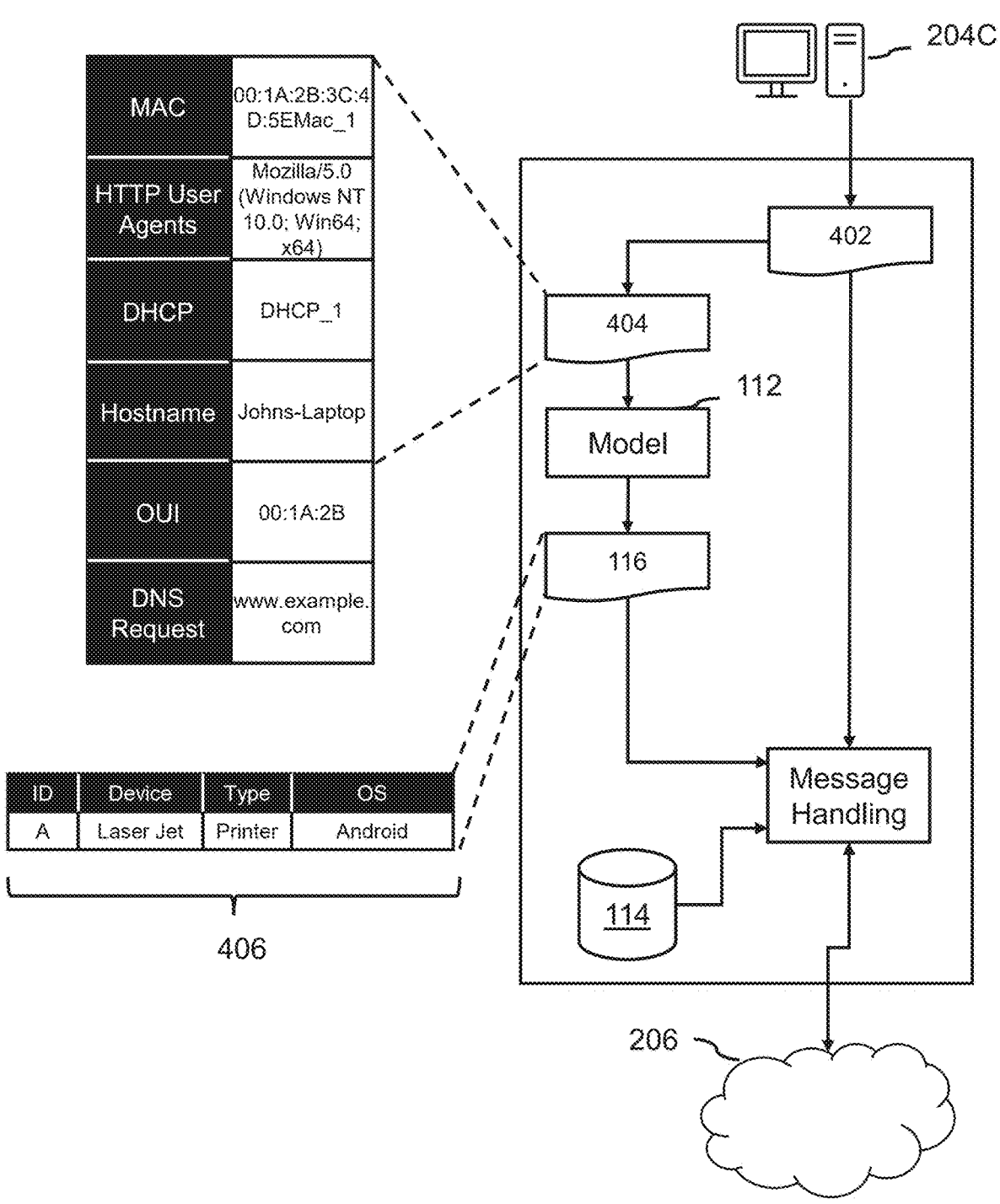
FIG. 4 is a schematic flow diagram showing the method according to examples.

As briefly mentioned above, the storage 104 includes instructions 110 for performing a method 300 in the network management device 100, shown in the flow chart of FIG. 3. The method 300 will now be described with respect to FIGS. 3 and 4, wherein FIG. 4 is a schematic illustration of the method 300 implemented by the network management device 100. The method 300 involves providing 302 a fingerprint determination model 112 configured to determine one or more characteristics of user devices 204A to 204F based on messages generated by respective user devices 204A to 204F.

Providing 302 the fingerprint determination model 112 may involve, for example, running a computer program module and/or implementing a program that is based on computer-executable instructions stored in storage of the network management device 100.

A first message 402 is received 304 from a user device 204C. This message 304 may be a message directed to the network management device 100, for example, during a network attach and/or authentication procedure. Alternatively, this message 402 may be directed to one of the other devices 204A to 204F in the network 200, or to a computing device in an external communication network 206. The message 402 may be collected actively, or passively. Actively collecting such messages may involve sending an initial message to the user device 204C that causes the user device 204C to respond with the first message 402. In other examples, the first message 402 may be collected passively, by intercepting or diverting messages destined for other user devices 204A and 204B, or to the external network 206.

The first message 402 is processed 306 by the network management device 100 to determine a set of one or more user device message characteristics 404. Examples of such user device message characteristics 404 are shown in a table in FIG. 4. These characteristics 404 may include any of: a MAC address associated with the user device 204C, an organizationally unique identifier (OUI), one or more HTTP user agent associated with the user device 204C, one or more dynamic host configuration protocol (DHCP) parameters associated with the said user device, a hostname associated with the user device 204C, one or more domain name system (DNS) query sent by, or otherwise associated with, the user device 204C. The one or more user device message characteristics 404 may also include any combination of two or more of the characteristics listed above.

Device fingerprint data 116 representing at least one determined characteristic 406 of the user deice 204C is generated 308 by processing the set of one or more user device message characteristics 404 using the fingerprint determination model 112. The model 112 will be described further below with respect to FIGS. 7 to 9. As shown in FIG. 4, the at least one determined characteristics 406 may include, for example, a device type associated with the user device 204C, an operating associated with the user device 204C, a device name or model of the user device 204C. As will be appreciated from the examples described herein, the determined characteristics may also include device manufacturer or brand of the user devic2 204C, an organization associated with the user device 204C, a version of software running on the device 204C, and so forth. The one or more determined characteristics 406 may include any suitable combination of these examples of such characteristics.

The characteristics of the device 204C that are determined may be dependent on the available user device message characteristics 404 derived from the message 402. The model 112 may generally be configured to process whichever user device message characteristics 404 are available to determine a device characteristic. Some device characteristics may be explicitly signaled, or otherwise provided, in the user device message characteristics 404. In other examples, the user device message characteristics 404 will include clues which can be used to derive user device characteristics.

The network management device 100 controls 310 one or more network functions for the user device 204C based on the at least one determined characteristics 406 of the user device 204C represented in the device fingerprint data 116.

By providing a fingerprint determination model in a network management device 100 that is capable of determining one or more characteristics of devices 204C in the network based on message characteristics 404 it is possible to perform device fingerprinting in the network 200 without performing callouts to a cloud-based fingerprinting service, such as the device fingerprinting server 208. As such, it becomes possible to control one or more network functions for the user devices 204A to 204F, while mitigating a degradation in latency performance that may otherwise be incurred.

As described above with respect to FIG. 1, the storage 104 may be used to store a plurality of network management rules 114 for controlling one or more network functions for the user device 204C. Controlling 310 the one or more network functions for the user device 204C may involve identifying a network management rule 114 associated with the at least one determined characteristics of the said user device 204C and applying the identified network management rule to communications associated with the user device 204C. Controlling 310 may involve preventing the user device 204C from communicating with the external network 206, applying limits on bandwidth and the volume of data transmission with the external network 206, and/or performing similar controlling operations between the user device 204C and other devices 204A and 204B in the network 200.

The network management rules 114 may be configured to restrict the permissions and/or network access for devices 204A to 204F based on the respective device characteristics. These rules 114 may, for example restrict one or more permissions for a user device 204C if one or more associated characteristics of the device match one or more characteristics associated with the respective rule. In other examples, a network management rule 114 may specify one or more permission and/or network access restrictions for a user device 204C if the one or more determined characteristics 406 of that device 204C are suspicious, or suspected to be fraudulent. In this way it becomes possible to increase the security in the network 200.

In some examples, controlling the one or more network functions may include determining whether the one or more determined network characteristics of a user device 204C conform to one or more advertised characteristics of that user device 204C. The one or more advertised characteristics may be indicated in a service advertisement message generated by the user device 204C, for example, a multicast DNS protocol services advertisement message. In this case, the method 300 may involve controlling the distribution of the service advertisement message in the local network 200 based on an outcome of the determining. In some cases, malicious devices, or users, may disguise their devices as other device types. For example, an attacker may disguise their device as a printer on a local network 200, and advertise printing services. User device 204A to 204F may then try to print documents using the malicious device, and thereby divulge personal or private information. By identifying devices for which determined characteristics to not match advertised characteristics enables the detection of malicious users.

In this example, the network management rules 114 may specify that if it is determined that the one or more determined characteristics 406 of the user device 204C do not conform to the one or more advertised characteristics of the user device 204C, controlling the distribution of the service advertisement message in the local network 200 includes preventing the service advertisement message from being sent to further user devices 204A and 204B in the local network 200. Alternatively, if it is determined that the one or more determined characteristics 406 of the user device 204C do conform to the one or more advertised characteristics of the user device 204C, controlling the distribution of the service advertisement message in the local network 200 includes allowing the service advertisement message to be sent to further user devices 204A and 204B in the local network 200.

Alternatively, or additionally, controlling 310 the one or more network function for the user device 204C may involve determining whether the user device 204C is using the same MAC address as a further user device 204A in the local network 200, and controlling access to the local network 200 for the user device 204C based on an outcome of that determining. For example, the one or more network management rules 114 may specify that if the user device 204C is determined to be using the same MAC address as another user device 204A, that communications from that user device 204C may be controlled, for example, the distribution of messages from that device 204C to other devices in the network may be restricted or prevented. In this way, it is possible to efficiently and quickly detect whether one or more devices are performing MAC spoofing and to take actions to mitigate a security risk that arises therefrom.

Figure 5:
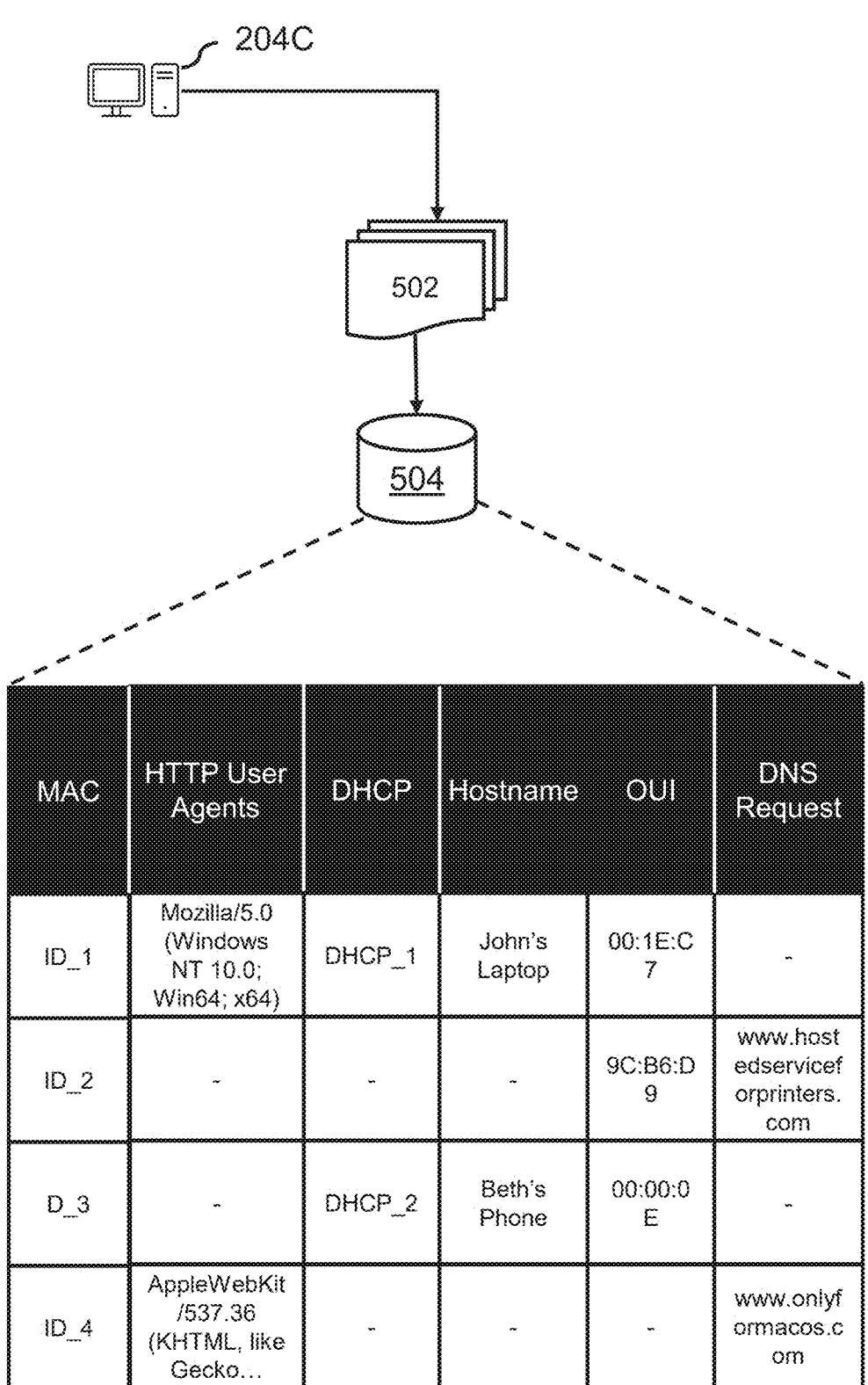
FIG. 5 is a schematic diagram showing user message characteristics according to examples.

In some examples, a plurality of messages may be received from the user device 204C. Turning to FIG. 5, an example is shown in which a plurality of messages 502 are received from the user device 204C. These messages 502 may be received over a predetermined period of time. In some cases the messages 502 may be received in close succession, and in other cases, the messages 502 may be received over an extended period of time. These messages may be stored in a database 504, or datastore, in the storage 104 of the network management device 100. That database 504 may be used to store messages from a plurality of devices.

In the example of FIG. 5, the database 504 may also store user device message characteristics for a plurality of devices. Each message sent by a user device may be processed to determine one or more of the user device message characteristics 404. By collecting a plurality of messages from the device 204C and it is possible to process these messages to determine further user message device characteristics 404 for the user device. The database 504 may store the determined user device message characteristics, and as new user device message characteristics are determined, these may be added to the database 504. In the example shown in FIG. 5, each row in the table represents a set of user device message characteristics that have been determined to be associated with a specific ID, which in this case is a MAC address, used by a respective device.

It will be appreciated that while a finite number of user device message characteristics are shown in the example of FIG. 5, any suitable number and type of message characteristic may be determined and stored. In some examples, multiple versions of the same type of user device message characteristic, such as DNS queries, may be collected and associated with a single MAC address. This may be the case where one device is capable of being associated with multiple versions of the same type of user device message characteristic, and/or where the assigned MAC addresses for devices 204A to 204F changes in the network 200.

As more user device message characteristics are determined for a given device 204C, further processing of these additional user device message characteristics may be performed to determine additional, and/or more accurate, determined characteristics of the device 204C. For example, based on a first message 402, it may only be possible to determine one characteristic of the device 204C such as a device type. As additional user device message characteristics are determined it may become possible to process these to determine further characteristics of the device 204C such as the make, model, operating system, and so forth, for the device 204C.

Figure 6:
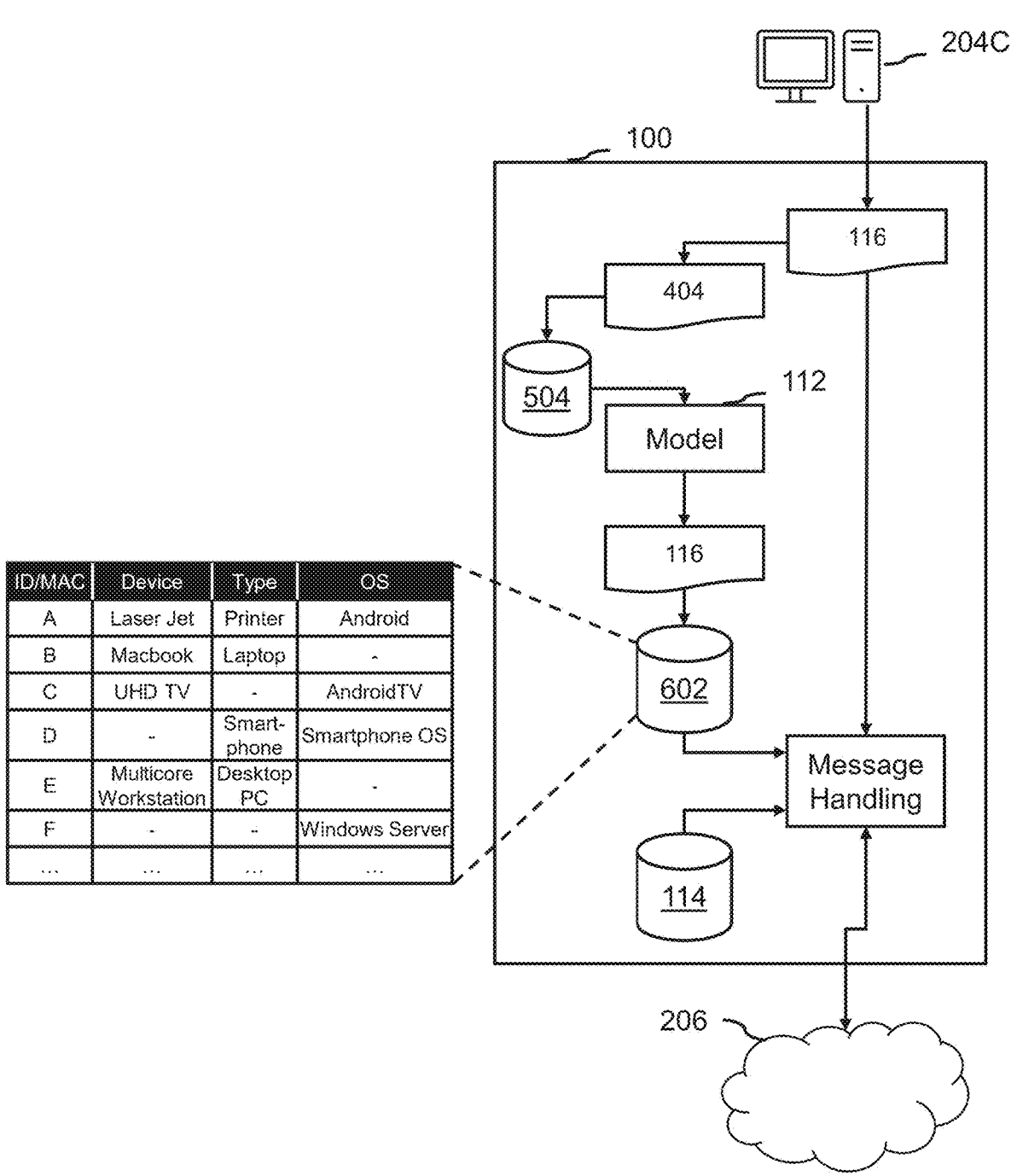
FIG. 6 is a schematic flow diagram showing the method according to examples, and in which examples of the device fingerprint data are shown.

Turning to FIG. 6 an example is shown in which the storage 104 of the network management device 100 includes a database 602 storing device fingerprint data 116 for a plurality of devices 204A to 204F. The determined characteristics for each device 204C included in the fingerprint data 116 may not include the same types of characteristics for each device 204A to 204F. For example, in the fingerprint data stored in the database 602 shown in FIG. 6, the first set of characteristics associated with a first device 204A includes an ID, which may be a MAC address, device name, device type, and an operating system (OS) while a first set of characteristics for a second device 204B includes a device name, type, but no device type. The characteristics that are included for each device in the fingerprint data 116 will depend on the way in which the fingerprint data is generated, for example, based on which user device message characteristics are available and are used to determine the characteristics of the device 204A or 204B.

The model 112 used to determine the characteristics of the device 204C may be, or include, a machine learning classifier. For example, the model 112 may comprise a support vector machine, and/or an artificial neural network.

Support vector machines (SVMs) are of particular use in the context of classification and regression tasks. SVMs work well in high-dimensional spaces, making them suitable for applications like text and image classification where the feature space is large. They can handle both linear and non-linear data due to the use of different kernel functions (like linear, polynomial, radial basis function, and sigmoid), which allows them to adapt to a wide range of data types. SVMs may be used to focus on finding the hyperplane that maximizes the margin between classes, which often leads to better generalization and robustness in classification tasks. Regularization parameters used in SVMs may help to prevent overfitting, making them more robust to noise in the data. SVMs use a subset of training points (support vectors) in their decision function, making them memory efficient and hence suitable for deployment in machines that have restrictive computing resources such as network management devices 100, which are typically tasked with a number of other network functions. SVMs are particularly powerful when dealing with complex but smaller datasets, as their training time can be longer for very large datasets. With appropriate settings of the cost function, SVMs can be effective in scenarios with imbalanced class distributions.

While SVMs have some limitations, such as being less effective on very large datasets due to higher training time, and the need for careful selection of the kernel and regularization parameters, they are still desirable for applications such as those described herein due to their robustness and effectiveness in high-dimensional spaces.

Artificial neural networks (ANNs) are also powerful in various computational tasks for several reasons. ANNs can learn and model complex relationships in data, making them effective for tasks like pattern recognition, classification, and regression. They can adapt to changing input, allowing them to improve their performance as more data becomes available. ANNs are capable of generalizing from the training data, meaning they can make accurate predictions or decisions based on new, unseen data. This is of particular importance in the present case as the messages and protocols used in communications evolve over time. ANNs are particularly good at modeling non-linear relationships, which are common in real-world data. ANNs can perform parallel processing, which can lead to significant performance gains, especially in tasks involving large datasets or complex computations. Due to their distributed nature, ANNs can continue to function even if some of their components fail or are damaged. ANNs have the ability to handle noisy or incomplete data, making them. These strengths make ANNs a popular choice for a variety of complex and data-intensive tasks. However, they also have drawbacks, such as the need for large amounts of training data.

Figure 7:
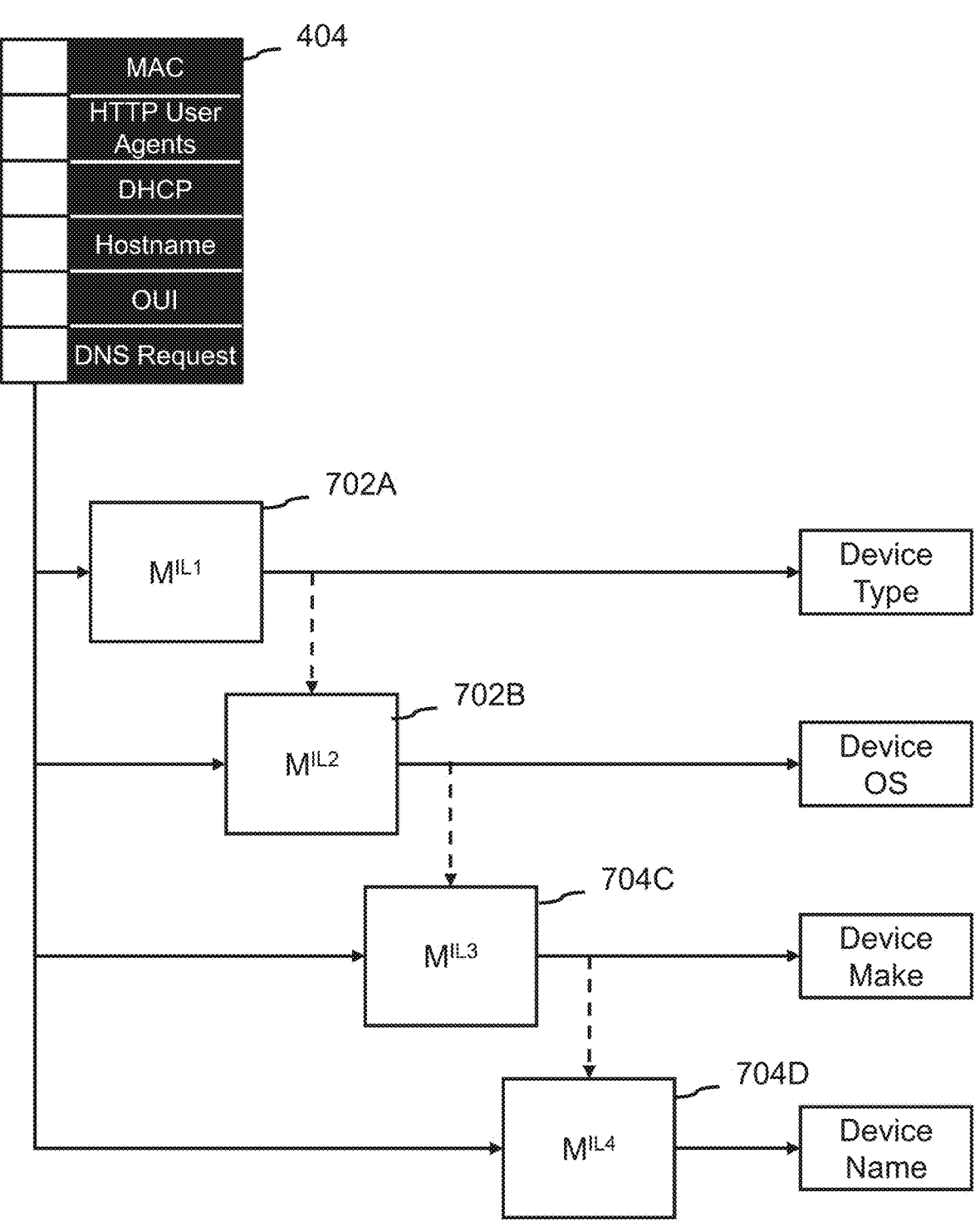
FIG. 7 is a schematic diagram showing an inference time application of the fingerprint determination model according to examples.

In some examples, the model 112 may include a plurality of inference layers. Turning to FIG. 7 an example is shown in which the model comprises four inference layers 702A to 702D. Where the model 112 comprises an artificial neural network, an inference layer may comprise an input layer, one or more hidden layers, and an output layer, which is a fully connected layer. Which is to say each inference layer may comprise an artificial neural network. In other examples, each inference layer may comprise a portion of an artificial neural network, and/or may be formed of overlapping hidden layers with one or more other inference layers.

In other examples, such as where the model 112 is a support vector machine, each inference layer may be a separate SVM. In the example shown in FIG. 7, each inference layer 702A to 702D is configured to determine a different characteristic of a user device 204C based at least on the user device message characteristics 404 associated with that device 204C. The first inference layer 702A is configured to determine a device type for the user device 204C. The second inference layer 702B is configured to determine an OS running on the device 204C. The third inference layer 702C is configured to determine a make, such as a brand or manufacturer, of the device 204C. The fourth inference layer 702D may be configured to determine a name of the device 204C, which may be for example, a model name, or a unique name assigned to the device 204C. As discussed above, other examples of device characteristics may be included, and the model 112 may include any suitable combination of inference layers for determining such characteristics.

The second, third, and fourth inference layers 702A to 702D in this example, are configured to process the set of one or more user device message characteristics 404 and at least one determined characteristic of the user device 204C output from a prior inference layer. The second inference layer 702B, for example, processes the set of one or more user device message characteristics 404 and a determined device type output from the first inference layer 702A.

The third inference layer 702C process the set of one or more user device message characteristics 404 and may also process the device type and/or the device OS output from the second inference layer 702B to determine the device make. Each of the posterior inference layers (second, third, fourth, and so on) may process determined characteristics output from any combination of the prior inference layers 702A to 702C. Some determined characteristics for a device 204C may be considered of a higher class, or order, than other characteristics. For example, a device type may be considered a higher class of characteristic than the device OS because the device type may be associated with a plurality of potential device Oss, whereas a device OS may only be associated with a single device type.

By implementing a plurality of inference layers it becomes possible to determine more accurate device characteristics. Additionally, the computational complexity may be reduced, as the determination of a lower class of characteristic may be made without the burden of collecting additional user device message characteristics, but may instead benefit from a narrowing of the potential output space, based on a prior determined characteristic of a higher class.

The method 300, as executed according to the instructions 110 in the storage 104, may additionally involve receiving model data 120 for implementing the fingerprint determination model 112 and storing the received model data 120 for providing the fingerprint determination model 112. The model data 120 may include training data for training the fingerprint determination model 112, computer-executable instructions for implementing the fingerprint determination model 112, and/or update data representing an update to be made to the fingerprint determination model 112.

Where the model data 12 includes training data, this may allow the network management device to be provided with instructions for implementing the model, which may then be trained based on appropriate training data. By receiving the training data, it is possible for up-to-date training data to be sent to the network management device 100 at any given time to train, or re-train the model 112, thereby increasing the accuracy and effectiveness of the model 112. Additionally, some implementations of the network management device 100 may include larger resource capabilities than others. As such, providing the training data to the network management device 100 to allow it to train the model 112 itself, may allow for efficiency and/or optimization strategies to be used. For example, using only a subset of the training data to train the model 112, pruning the training data to use only the most relevant training data for a given implementation of the model 112. Some deployments of network management devices 100 may be required to operate in networks 200 with diverse device types and protocols. In other examples, a network management device may be deployed in a simpler network 200 in which only a limited number of functions, protocols, and/or device types used. As such smaller training sets, may be used as the model 112 may not be required to handle diverse or unseen situations.

In some examples, the network management device 100 may not be initially provided with instructions for implementing the model 112 but may receive these later. For example, the model 112 may be provided to network management devices as an update to existing network management devices 100 not currently configured to implement the model 112.

In some cases, such as where the capabilities of the network management device 100 are restrictive, update data which represents modifications to be made to the model 112 may be provided. Rather than receiving a complete model, or a set of training data that requires the network management device 100 to train the model, the update data may represent changes to be made to a model 112 already provided in the network management device 100. For example, in the case of an SVM, the update data may represent changes, or new values, to be used in the parameters for the SVM. Where the model 112 comprises an ANN, the update data may represent changes to be made to weight values representing one or more layers of the ANN.

As discussed above, the model 112 may be trained on the network management device 100 or using a remote computing device 210, for example as a cloud-based service which then provides the trained model 112, in the form of computer-executable instructions or program code, to the network management device 100. Training the model 112 in a cloud-based service may enable the use of larger, more diverse, and/or more complex, datasets to be used to train the model 112 thereby increasing the accuracy, and robustness, of the determinations of device characteristics the model 112 generates.

Figure 8:
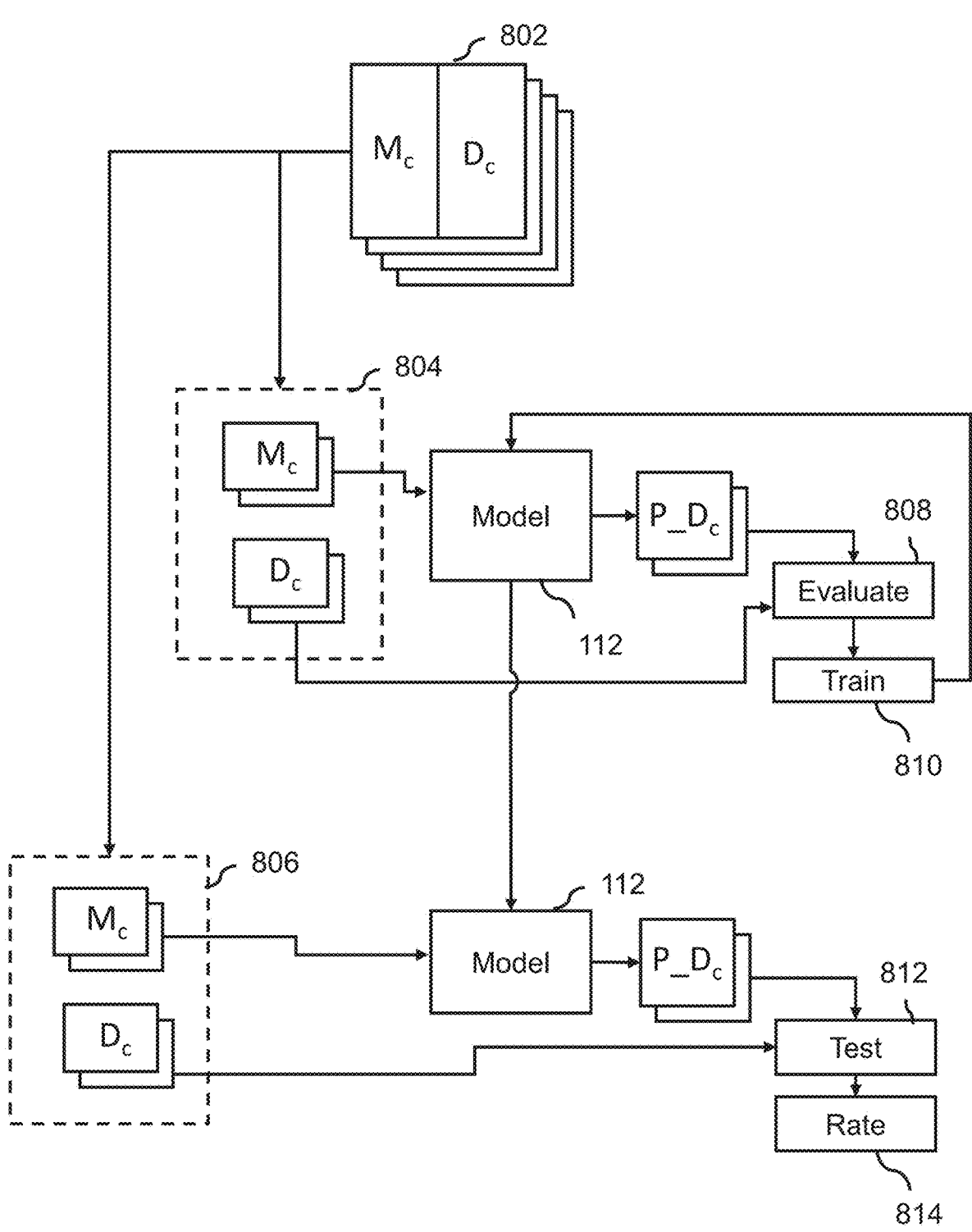
FIG. 8 is a schematic diagram showing a training and testing process for a fingerprint determination model according to examples.

FIG. 8 shows an example of a process for training the model 112 which may be performed either on the network management device 100 or as part of a cloud-based service. The training process comprises obtaining training data 802 that comprises a plurality of user device message characteristics MC and associated device characteristics DC for a plurality of different user device configurations. The training data 802 may be obtained from open source, or third-party, databases. Alternatively, or additionally, the training data 802 may be obtained from the users entering information on a portal, and/or in a test/development network environment in which the characteristics of a plurality of user devices are known, and the associated user device message characteristics are determined and stored in associated with the known characteristics of the associated user devices. Such a test/development environment may include a variety of diverse device types, makes, models, and configurations in order to generate diverse training data.

The training data 802 may be split into a first portion 804 used to train the model 112, and a second portion 806 used to test, or verify, the model 112. The user device message characteristics in the first portion 804 may be input to the model 112 to generate predicted device characteristics P_Dc. The predicted device characteristics may then be evaluated 808 based on the known device characteristics DC from the first portion of training data 804. Differences between the predicted and known device characteristics are used to train 810 the model 112. For example, model data defining the model, such as parameters, and/or weight values, may be updated based on the accuracy of the predicted device characteristics P_Dc. In the case of ANNs this may involve backpropagating through the ANN and updating the weight value based on loss, or difference, between the predicted and the known device characteristics. Similar processes may be used to tune parameters in an SVM to increase the accuracy of the prediction.

After training, the second portion 806 may be used to test, or verify, the performance of the model 112 after training. This may involve a similar process as described above, wherein the model's 112 performance may be tested 812 and rated 814 to determine whether further training and/or updating should be performed.

The model data 120 may be associated with a geographic region, for example, based on a geographic region in which the network management device 100 is deployed. In this case, the determination of the one or more characteristics of the user device 204C is associated with a specific geographic region. In some cases, the characteristics of user devices 204C may be correlated with a geographic location. For example, the most popular or commonly used devices in the United States may differ significantly to the most popular or commonly used devices in Europe, or Asia. By providing model data 120 that is geographically dependent it is possible to increase the accuracy of the determination of characteristics 406 of the user device 204C while mitigating an increase in processing and other computing resources that may otherwise be needed. By generating specialized model data 120 the performance of the model 112 may be increased in some locations without the need to train the model 112 on larger data sets. This geographic dependence may apply to any of the examples of model data 120 described above including training data 802, instructions for implementing the model 112, and update data representing updates to be made to the model 112.

Figure 9:
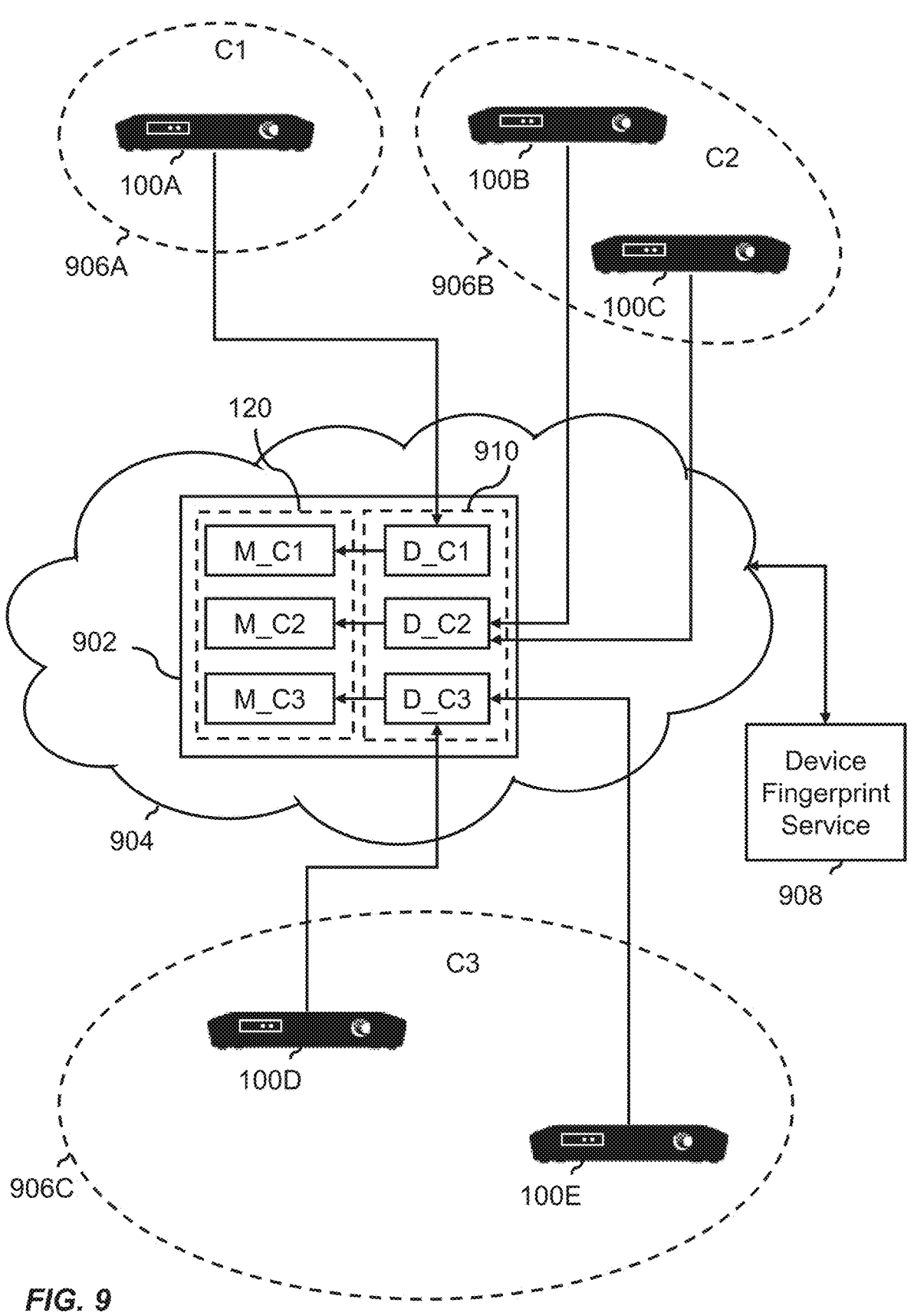
FIG. 9 is a schematic diagram showing a distributed implementation of a fingerprint determination model training process in which the model may be region specific according to examples.

FIG. 9 shows an example in which the model data 120 is associated with a geographic region. In the example of FIG. 9, the model data 120 is generated in a computing device 902 in the cloud 904. Three portions of model data 120 are generated, each being associated with a different geographic region. The model data 120 in this case is generated by collecting a plurality of messages from a plurality of user devices in one or more local networks. The local networks may each be located in, or otherwise associated with, a respective geographic location 906A to 906C. These messages may be provided to the computing device 902 in the cloud 904 by respective network management devices 100A to 1004E located in those networks.

The plurality of messages are stored in association with fingerprint data 910 associated with the plurality of user devices, wherein the fingerprint data includes device characteristics for the respective devices. In some examples, the fingerprint data for the plurality of devices across the networks may be collected by the respective network management devices 100A to 10E, either manually or automatically. In other examples, the cloud-based computing device 902 may use a device fingerprinting service 908 to centrally determine the fingerprint data 910.

The stored plurality of message may be segmented based on geographic location, such that separate portions of data are provided for each geographic location as shown in FIG. 9. Training data may then be generated for training the fingerprint determination model 112 based on a segmented potions portion of the stored plurality of messages associated with a given geographic location. Separate training data may be generated for each of the geographic locations based on a respective segmented portion of the stored plurality of messages for that geographic location.

Where the model data 120 comprises training data, these geographically specific portions of training data may be provided to network management devices 100A to 100E in the respective geographic locations directly. Where the model data 120 comprises computer-executable instructions for implementing the fingerprint determination model 112, separate models may be trained based on each of these separate portions of training data. Where the model data 120 comprises update data representing an update to be made to the fingerprint determination models 112, separate models may be trained for each geographic location, and the update data may be derived for each of those separate models.

In this way, the performance of the fingerprint determination models 112 used in each geographic location may be increased, while mitigating an increase in the size and/or complexity of the model 112 that may otherwise be used to provide similar performance improvement.

Figure 10:
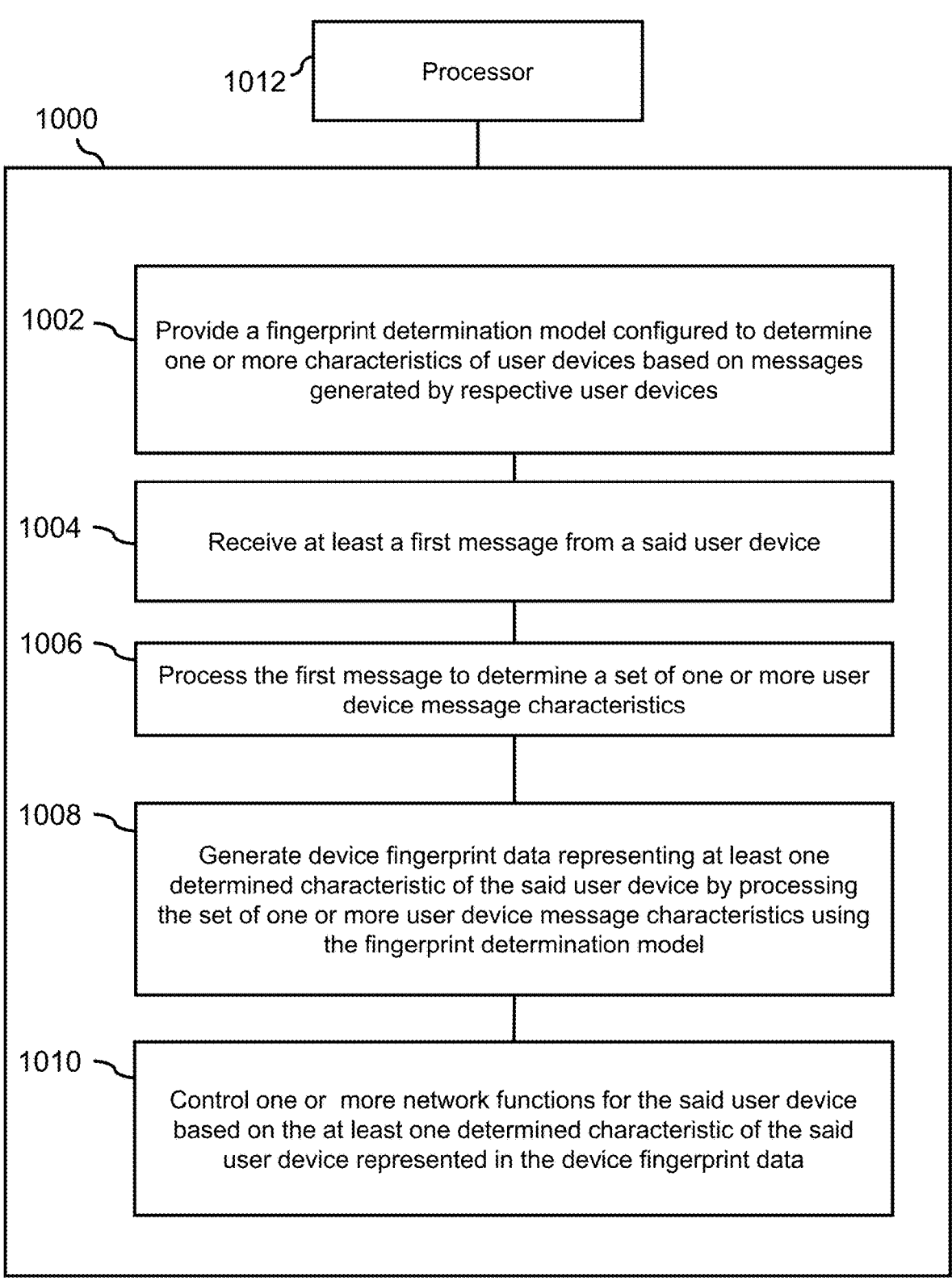
FIG. 10 is a schematic diagram showing a non-transitory computer-readable storage medium comprising computer-executable instructions for implementing a method for controlling one or more network functions for user devices according to examples.

FIG. 10 shows a non-transitory computer-readable storage medium 1000 on which is stored computer-executable instructions 1002 to 1010. The computer-executable instructions 1002 to 1010, when executed by a processor 1012, cause the processor to 1012 perform the method 300 described above including providing a fingerprint determination model configured to determine one or more characteristics of user devices based on messages generated by respective user devices; receiving at least a first message from a said user device; processing the first message to determine a set of one or more user device message characteristics; generating device fingerprint data representing at least one determined characteristic of the said user device by processing the set of one or more user device message characteristics using the fingerprint determination model; and controlling one or more network functions for the said user device based on the at least one determined characteristics of the said user device represented in the device fingerprint data.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

Numbered Clauses

Various aspects of the present disclosure are set out in the following numbered clauses:

1. A network management device configured to facilitate communication between user devices connected in a local network and computing devices in an external network, the network management device comprising one or more communication modules, at least one processor, and storage comprising computer-executable instructions which, when executed by the at least one processor, cause the network management device to:

provide a fingerprint determination model configured to determine one or more characteristics of user devices based on messages generated by respective user devices;

receive at least a first message from a said user device;

process the first message to determine a set of one or more user device message characteristics;

generate device fingerprint data representing at least one determined characteristic of the said user device by processing the set of one or more user device message characteristics using the fingerprint determination model; and control one or more network functions for the said user device based on the at least one determined characteristics of the said user device represented in the device fingerprint data.

2. The network management device of clause 1, wherein the storage includes a plurality of network management rules for controlling one or more network functions for the said user device, and wherein controlling one or more network functions for the said user device comprises:

identifying a network management rule associated with the at least one determined characteristics of the said user device; and applying the identified network management rule to communications associated with the said user device.

3. The network management device of clause 1 or clause 2, wherein controlling one or more network functions includes:

determining whether the one or more determined characteristics of the said user device conform to one or more advertised characteristics of the said user device, the one more advertised characteristics being indicated in a service advertisement message generated by the said user device; and controlling the distribution of the service advertisement message in the local network based on an outcome of the determining.

4. The network management device of clause 3, wherein:

if it is determined that the one or more determined characteristics of the said user device do not conform to the one or more advertised characteristics of the said user device, controlling the distribution of the service advertisement message in the local network includes preventing the service advertisement message from being sent to further user devices in the local network; and if it is determined that the one or more determined characteristics of the said user device do conform to the one or more advertised characteristics of the said user device, controlling the distribution of the service advertisement message in the local network includes allowing the service advertisement message to be sent to further user devices in the local network.

5. The network management device of any preceding clause, wherein controlling one or more network functions includes:

determining whether the said user device is utilizing the same media access control (MAC) address as a further user device in the local network; and controlling access to the local network for the said user device based on an outcome of the determining.

6. The network management device of any preceding clause, wherein the one or more user device message characteristics include any one or more of:

a MAC address associated with the said user device;

a hostname associated with the said user device;

one or more dynamic host configuration protocol (DHCP) parameters associated with the said user device;

one or more hypertext transfer protocol (HTTP) user agents associated with the said user device; and one or more domain name system (DNS) query.

7. The network management device of any preceding clause, wherein the at least one determined characteristic of the said user device includes any one or more of:

a device type associated with the said user device;

an operating system associated with the said user device;

a manufacturer of the said user device;

an organization associated with the said user device; and a model of the said user device.

8. The network management device of any preceding clause, wherein the model comprises a plurality of inference layers including:

a first inference layer configured to process the set of one or more user device message characteristics to determine a first characteristic of the said user device; and one or more further inference layers configured to process the set of one or more user device message characteristics and at least one determined characteristic of the said user device output from a prior inference layer.

9. The network management device of any preceding clause, wherein the model comprises a machine learning classifier.

10. The network management device of clause 9, wherein the model comprises at least one of:

a support vector machine; or an artificial neural network.

11. The network management device of any preceding clause, wherein the computer-executable instructions, when executed by the at least one processor, cause the network management device to:

receive model data for implementing the fingerprint determination model; and store the received model data for providing the fingerprint determination model.

12. The network management device of clause 11, wherein the model data comprises at least one of:

training data for training the fingerprint determination model;

computer-executable instructions for implementing the fingerprint determination model; or update data representing an update to be made to the fingerprint determination model.

13. The network management device of clause 11 or clause 12, wherein the model data is associated with a geographic region whereby the determination of one or more characteristics of the said user device is associated with a specific geographic region.

14. The network management device of any of clauses 11 to 13, wherein the model data is generated at least by:

collecting a plurality of messages from a plurality of user devices in one or more local networks;

storing the plurality of messages in association with fingerprint data associated with the plurality of user devices;

segmenting the stored plurality of messages based on a geographic location from which they are sent; and generating training data for training the fingerprint determination model based on a segmented portion of the stored plurality of messages associated with a given geographic location.

15. A method of controlling one or more network functions for user devices in a local network, the method comprising:

providing a fingerprint determination model configured to determine one or more characteristics of user devices based on messages generated by respective user devices;

receiving at least a first message from a said user device;

processing the first message to determine a set of one or more user device message characteristics;

generating device fingerprint data representing at least one determined characteristic of the said user device by processing the set of one or more user device message characteristics using the fingerprint determination model; and controlling one or more network functions for the said user device based on the at least one determined characteristics of the said user device represented in the device fingerprint data.

16. The method according to clause 15, wherein controlling one or more network functions for the said user device comprises:

identifying a network management rule associated with at the at least one determined characteristics of the said user device; and applying the identified network management rule to communications associated with the said user device.

17. The method of clause 15 or clause 16, wherein the one or more user device message characteristics include any one or more of:

a MAC address associated with the said user device;

a hostname associated with the said user device;

one or more dynamic host configuration protocol (DHCP) parameters associated with the said user device;

one or more hypertext transfer protocol (HTTP) user agents associated with the said user device; and one or more domain name system (DNS) query.

18. The method of any one of clauses 15 to 17, wherein the at least one determined characteristic of the said user device includes any one or more of:

a device type associated with the said user device;

an operating system associated with the said user device;

a manufacturer of the said user device;

an organization associated with the said user device; and a model of the said user device.

19. The method of any one of clauses 15 to 18, wherein the model comprises a plurality of inference layers including:

a first inference layer configured to process the set of one or more user device message characteristics to determine a first characteristic of the said user device; and one or more further inference layers configured to process the set of one or more user device message characteristics and at least one determined characteristic of the said user device output from a prior inference layer.

20. The method of any one of clauses 15 to 19, wherein the model comprises a machine learning classifier.

21. The method of clause 20, wherein the machine learning classifier comprises any one or more of:

a support vector machine; or an artificial neural network.

22. The method of any one of clauses 15 to 21, wherein the method comprises:

receiving model data for implementing the fingerprint determination model; and storing the received model data for providing the fingerprint determination model.

23. The method of clause 22, wherein the model data comprises at least one of:

training data for training the fingerprint determination model;

computer-executable instructions for implementing the fingerprint determination model; or update data representing an update to be made to the fingerprint determination model.

24. The method of clause 22 or 23, wherein the model data is associated with a geographic region whereby the determination of one or more characteristics of the said user device is associated with a specific geographic region.

25. The method of any one of clauses 22 to 24, wherein the model data is generated at least by:

collecting a plurality of messages from a plurality of user devices in one or more local networks;

storing the plurality of messages in association with fingerprint data associated with the plurality of user devices;

segmenting the stored plurality of messages based on a geographic location from which they are sent; and generating training data for training the fingerprint determination model based on a segmented portion of the stored plurality of messages associated with a given geographic location.

26. A non-transitory computer-readable storage medium comprising computer-executable instructions which, when executed by a processor cause the processor to:

provide a fingerprint determination model configured to determine one or more characteristics of a user device based on messages generated by the user device;

receive at least a first message from a said user device;

process the first message to determine a set of one or more user device message characteristics;

generate device fingerprint data representing at least one determined characteristic of the said user device by processing the set of one or more user device message characteristics using the fingerprint determination model; and control one or more network functions for the said user device based on the at least one determined characteristics of the said user device represented in the device fingerprint data.

The invention claimed is:

1. A network management device at an edge of a local network, wherein the network management device is configured to facilitate communication between a plurality of user devices connected in the local network and computing devices in an external network, the network management device comprising one or more communication modules, at least one processor, and storage comprising computer-executable instructions which, when executed by the at least one processor, cause the network management device to:

provide a fingerprint determination model configured to determine two or more characteristics of the plurality of user devices based on messages generated by respective user devices, wherein the fingerprint determination model comprises a plurality of inference layers, each of the plurality of inference layers configured to determine a different characteristic from other inference layers of the plurality of inference layers;

receive at least a first message from a first user device of the plurality of user devices;

process the first message to determine a set of one or more user device message characteristics;

generate device fingerprint data representing at least two determined characteristics of the first user device by:

processing, in a first inference layer of the plurality of inference layers, the set of one or more user device message characteristics to determine a first characteristic of the first user device; and processing, in a second inference layer of the plurality of inference layers, the set of one or more user device message characteristics and the first characteristic of the first user device to determine a second characteristic of the first user device, and control one or more network functions for the first user device based on the at least two determined characteristics of the first user device represented in the device fingerprint data.

2. The network management device of claim 1, wherein the storage includes a plurality of network management rules for controlling one or more network functions for the first user device, and wherein controlling one or more network functions for the first user device comprises:

identifying a network management rule associated with the at least two determined characteristics of the first user device; and applying the identified network management rule to communications associated with the first user device.

3. The network management device of claim 1, wherein controlling one or more network functions includes:

determining whether the at least two determined characteristics of the first user device conform to one or more advertised characteristics of the first user device, the one more advertised characteristics being indicated in a service advertisement message generated by the first user device; and controlling a distribution of the service advertisement message in the local network based on an outcome of the determining.

4. The network management device of claim 3, wherein:

if it is determined that the at least two determined characteristics of the first user device do not conform to the one or more advertised characteristics of the first user device, controlling the distribution of the service advertisement message in the local network includes preventing the service advertisement message from being sent to further user devices in the local network; and if it is determined that the at least two determined characteristics of the first user device do conform to the one or more advertised characteristics of the first user device, controlling the distribution of the service advertisement message in the local network includes allowing the service advertisement message to be sent to further user devices in the local network.

5. The network management device of claim 1, wherein controlling one or more network functions includes:

determining whether the first user device is utilizing a media access control (MAC) address that is the same as a MAC addressed utilized by a further user device in the local network; and controlling access to the local network for the first user device based on an outcome of the determining.

6. The network management device of claim 1, wherein the one or more user device message characteristics include any one or more of:

a media access control (MAC) address associated with the first user device;

a hostname associated with the first user device;

one or more dynamic host configuration protocol (DHCP) parameters associated with the first user device;

one or more hypertext transfer protocol (HTTP) user agents associated with the first user device; and one or more domain name system (DNS) query.

7. The network management device of claim 1, wherein the at least two determined characteristics of the first user device includes any two or more of:

a device type associated with the first user device;

an operating system associated with the first user device;

a manufacturer of the first user device;

an organization associated with the first user device; and a model of the first user device.

8. The network management device of claim 1, wherein the fingerprint determination model comprises a machine learning classifier.

9. Network management device of claim 8, wherein the fingerprint determination model comprises at least one of:

a support vector machine; or an artificial neural network.

10. The network management device of claim 1, wherein the computer-executable instructions, when executed by the at least one processor, cause the network management device to:

receive model data for implementing the fingerprint determination model; and store the received model data for providing the fingerprint determination model.

11. The network management device of claim 10, wherein the model data comprises at least one of:

training data for training the fingerprint determination model;

computer-executable instructions for implementing the fingerprint determination model; or update data representing an update to be made to the fingerprint determination model.

12. The network management device of claim 10, wherein the model data is associated with a geographic region whereby a determination of at least one characteristic of the first user device is associated with a specific geographic region.

13. The network management device of claim 10, wherein the model data is generated at least by:

collecting a plurality of messages from at least the plurality of user devices in one or more local networks;

storing the plurality of messages in association with fingerprint data associated with the plurality of user devices;

segmenting the stored plurality of messages based on a geographic location from which they are sent; and generating training data for training the fingerprint determination model based on a segmented portion of the stored plurality of messages associated with a given geographic location.

14. A method of controlling one or more network functions for a plurality of user devices in a local network, the method being performed by a network management device at an edge of the local network, wherein the network management device is configured to facilitate communication between the plurality of user devices connected in the local network and computing devices in an external network, the method comprising:

providing a fingerprint determination model configured to determine two or more characteristics of the plurality of user devices based on messages generated by respective user devices, wherein the fingerprint determination model comprises a plurality of inference layers, each of the plurality of inference layers configured to determine a different characteristic from other inference layers of the plurality of inference layers;

receiving at least a first message from a first user device of the plurality of user devices;

processing the first message to determine a set of one or more user device message characteristics;

generating device fingerprint data representing at least two determined characteristics of the first user device by:

processing, in a first inference layer of the plurality of inference layers, the set of one or more user device message characteristics to determine a first characteristic of the first user device; and processing, in a second inference layer of the plurality of inference layers, the set of one or more user device message characteristics and the first characteristic of the first user device to determine a second characteristic of the first user device, and controlling one or more network functions for the first user device based on the at least two determined characteristics of the first user device represented in the device fingerprint data.

15. The method according to claim 14, wherein controlling one or more network functions for the first user device comprises:

identifying a network management rule associated with at the at least two determined characteristics of the first user device; and applying the identified network management rule to communications associated with the first user device.

16. The method of claim 14, wherein the two or more user device message characteristics include any two or more of:

a media access control (MAC) address associated with the first user device;

a hostname associated with the first user device;

one or more dynamic host configuration protocol (DHCP) parameters associated with the first user device;

one or more hypertext transfer protocol (HTTP) user agents associated with the first user device; and one or more domain name system (DNS) query.

17. The method of claim 14, wherein the at least two determined characteristics of the first user device includes any two or more of:

a device type associated with the first user device;

an operating system associated with the first user device;

a manufacturer of the first user device;

an organization associated with the first user device; and a model of the first user device.

18. The method of claim 14, wherein the fingerprint determination model comprises a machine learning classifier.

19. The method of claim 18, wherein the machine learning classifier comprises any one or more of:

a support vector machine; or an artificial neural network.

20. The method of claim 14, wherein the method comprises:

receiving model data for implementing the fingerprint determination model; and storing the received model data for providing the fingerprint determination model.

21. The method of claim 20, wherein the model data comprises at least one of:

training data for training the fingerprint determination model;

computer-executable instructions for implementing the fingerprint determination model; or update data representing an update to be made to the fingerprint determination model.

22. The method of claim 20, wherein the model data is associated with a geographic region whereby a determination of one or more characteristics of the first user device is associated with a specific geographic region.

23. The method of claim 20, wherein the model data is generated at least by:

collecting a plurality of messages from the plurality of user devices in one or more local networks;

storing the plurality of messages in association with fingerprint data associated with the plurality of user devices;

segmenting the stored plurality of messages based on a geographic location from which they are sent; and generating training data for training the fingerprint determination model based on a segmented portion of the stored plurality of messages associated with a given geographic location.

24. A non-transitory computer-readable storage medium comprising computer-executable instructions which, when executed by a processor cause the processor to:

at a network management device at an edge of a local network, wherein the network management device is configured to facilitate communication between a plurality of user devices connected in the local network and computing devices in an external network:

provide a fingerprint determination model configured to determine two or more characteristics of a user device based on messages generated by the user device, wherein the fingerprint determination model comprises a plurality of inference layers, each of the plurality of inference layers configured to determine a different characteristic from other inference layers of the plurality of inference layers;

receive at least a first message from the user device;

process the first message to determine a set of one or more user device message characteristics;

generate device fingerprint data representing at least two determined characteristics of the user device by:

processing, in a first inference layer of the plurality of inference layers, the set of one or more user device message characteristics to determine a first characteristic of the user device; and processing, in a second inference layer of the plurality of inference layers, the set of one or more user device message characteristics and the first characteristic of the user device to determine a second characteristic of the user device; and control one or more network functions for the user device based on the at least two determined characteristics of the user device represented in the device fingerprint data.

* * * * *